(12) United States Patent
Zhou et al.

(10) Patent No.: US 10,696,075 B2
(45) Date of Patent: Jun. 30, 2020

(54) FILM MEDIA KIT

(71) Applicant: Hewlett-Packard Development Company, L.P., Houston, TX (US)

(72) Inventors: Xiaoqi Zhou, San Diego, CA (US); Francois K. Pirayesh, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 248 days.

(21) Appl. No.: 15/772,074

(22) PCT Filed: Dec. 21, 2015

(86) PCT No.: PCT/US2015/067165
§ 371 (c)(1),
(2) Date: Apr. 29, 2018

(87) PCT Pub. No.: WO2017/111913
PCT Pub. Date: Jun. 29, 2017

(65) Prior Publication Data
US 2018/0319187 A1  Nov. 8, 2018

(51) Int. Cl.
*B41M 5/00* (2006.01)
*B41M 3/00* (2006.01)
(Continued)

(52) U.S. Cl.
CPC ............ *B41M 3/008* (2013.01); *B32B 37/00* (2013.01); *B32B 37/025* (2013.01);
(Continued)

(58) Field of Classification Search
CPC ...... B41M 5/52; B41M 5/502; B41M 5/0047; B41M 5/36; B32B 37/00; B32B 37/025
(Continued)

(56) References Cited

U.S. PATENT DOCUMENTS 6,226,909 B1   5/2001 Banning
7,416,776 B2   8/2008 Emslander et al.
(Continued)

FOREIGN PATENT DOCUMENTS

EP   2085242      8/2009
JP   H04177625    6/1992
JP   2000163804   6/2000

OTHER PUBLICATIONS

International Search Report and Written Opinion for International Application No. PCT/US2015/067165 dated Sep. 20, 2016, 7 pages.

*Primary Examiner* — Betelhem Shewareged
(74) *Attorney, Agent, or Firm* — Dierker & Kavanaugh PC

(57) ABSTRACT

A film media kit includes a first part and a second part. The first part is a first transparent film element having a first film having front side and back sides, wherein the front side is a high gloss smooth surface and wherein the back side supports an image-receiving layer for receiving a mirror-reflected reversed image printed on top of the image-receiving layer. The second part includes a second transparent film element having a second film having front and back sides, wherein the front side supports an adhesion layer and the back side supports a light diffusion layer. The second part also includes a third film element having a third film/paper having front and back sides, wherein the back side supports an anti-block layer. A method of manufacturing the film media kit and a film media for both front-lit and back-lit viewing are also provided.

15 Claims, 3 Drawing Sheets

(51) Int. Cl.
  *B41M 5/52* (2006.01)
  *B32B 37/00* (2006.01)
  *B41M 5/36* (2006.01)
  *B41M 5/50* (2006.01)

(52) U.S. Cl.
  CPC ............ *B41M 5/0047* (2013.01); *B41M 5/36* (2013.01); *B41M 5/502* (2013.01); *B41M 5/52* (2013.01)

(58) Field of Classification Search
  USPC ...................................................... 428/32.13
  See application file for complete search history.

(56) References Cited

U.S. PATENT DOCUMENTS

| | | | |
|---|---|---|---|
| 8,932,710 B2* | 1/2015 | Inoue | C08G 18/6254 |
| | | | 428/343 |
| 8,988,634 B2 | 3/2015 | Lee et al. | |
| 2002/0155952 A1 | 10/2002 | Furukawa | |
| 2004/0224103 A1 | 11/2004 | Karst et al. | |
| 2007/0245605 A1 | 10/2007 | Hayes et al. | |
| 2009/0301907 A1* | 12/2009 | Mason | C11D 17/049 |
| | | | 206/223 |
| 2014/0252330 A1 | 9/2014 | Oh et al. | |
| 2018/0319187 A1* | 11/2018 | Zhou | B41M 3/008 |

* cited by examiner

FILM MEDIA KIT

BACKGROUND

The popularity of large format inkjet printing is rapidly increasing. The uses include wall coverings, signs, banners, and the like with the images in a form of designs, symbols, photographs, and/or text. Some inkjet large format applications such as illuminated signboard use a polymeric film as the supporting base and on which one side is applied an ink-receiving layer as the carrier of the image.

The film media can be used as regular "front-side" viewing, where light, e.g., sunlight, illuminates the media from the front and reflects back to the viewer's eyes. Some film media can be used as "back-side" viewing, where light equipped in a light box illuminates from the opposite side (back) of the film media through a light diffusion panel or light diffusion coating layer and illuminates the printed image, which may then be seen by the viewer looking at the front-side of the film media.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
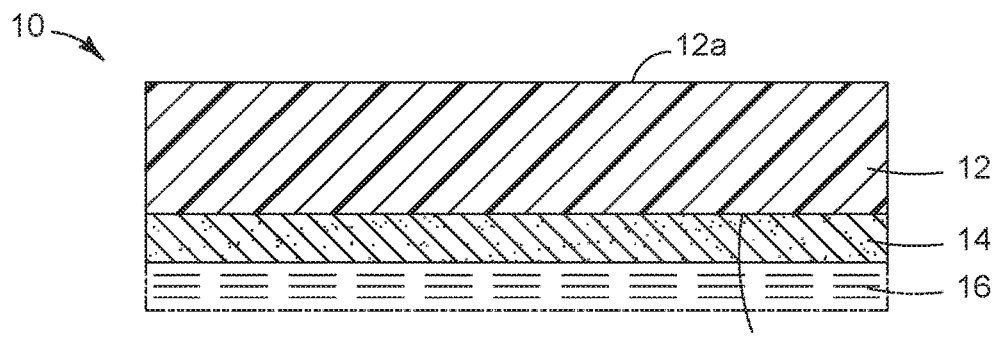
FIG. 1 is cross-sectional view of a first film element, according to an example.

Reference is made now in detail to specific examples, which illustrates the best mode presently contemplated by the inventors for practicing examples of the present disclosure. Alternative examples are also briefly described as applicable.

To further illustrate the present disclosure, examples are given herein. It is to be understood that these examples are provided for illustrative purposes and are not to be construed as limiting the scope of the present disclosure.

A challenge to the use of film media is durability of the printed image on the film media. Most application cases are that image is printed on front side (viewer facing printed side of the media) of the film media. In this case, a slight mechanical action, such as rubbing and scratching on the printed image, may turn into a very apparent defect under the illumination of light, especially back light. While various attempts have been made to improve the anti-mechanical damage for the front side printing, one alternative solution is reverse back printing where the image is printed on the opposite side of the viewer. This solution may avoid any physical contact with the image. However, this approach may also negatively impact the image quality, since light diffusion when light illuminates from the backside may make the image foggy and appear to be low gamut.

The present disclosure is directed to a high gloss display film for latex, and other, ink printing. The film shows extremely high gloss and can be used for back-lit film display and front-lit film display. The printing image is very durable against mechanical scratching and shows high image quality and excellent fade resistance. The term "high gloss" may refer to a gloss lever greater than 95% at a viewing angle of 20° and "extremely high gloss" may refer a gloss level greater than 99.5% at a viewing angle of 20°. The term "very durable" may refer to the printed image's ability to withstand normal mechanical action, such as rubbing and scratching such as scratching by human figure nails, a car key or a metal coin.

The film media consists of a first transparent film element with an image-receiving coating on one side of a transparent first film, where the image can be reverse printed, and a second film element having a light diffusion layer and an adhesive layer on opposite sides of a second transparent film. By "reverse printed" is meant that a mirror image is printed on the back side of the first film element. Such reverse printing is easily controlled by software in the computer and/or printer.

A film media kit that includes the two film elements is provided, in which printing on the image-receiving layer is to be subsequently performed. Once printed, the two film elements, one with the reverse back printed film element, may be laminated. The resulting film media can be used both as front-viewing film media and back-lit viewing media. When back illumination is off, the front light or daytime sun light may be projected on the non-printed surface, and the front surface of the film acts as a gloss amplifier to make the observer see a very high gloss image through the high transparent film. The gloss of the printed ink may not be as high as the gloss of the high transparent film, and gloss amplification serves to reflect more light back to the viewer and make the printed image appear glossier. Under such circumstances, the film media functions as a very high gloss front-lit media material. On the other hand, when back illumination lighting is on, the observer can also see a very high glossy and color-vivid back-lit image from the front side. This configuration provides a very good protection for the printed image against mechanical scratches and also against light fading. The image quality is excellent whether in the case of front side viewing or that of back-lit viewing.

Media Structure

The present disclosure is directed to providing a reverse printing display film which can be used as both front-view film media and back-lit film media. The disclosure also provides an example method to make such film media and an example method to use the film media.

Figure 2A:
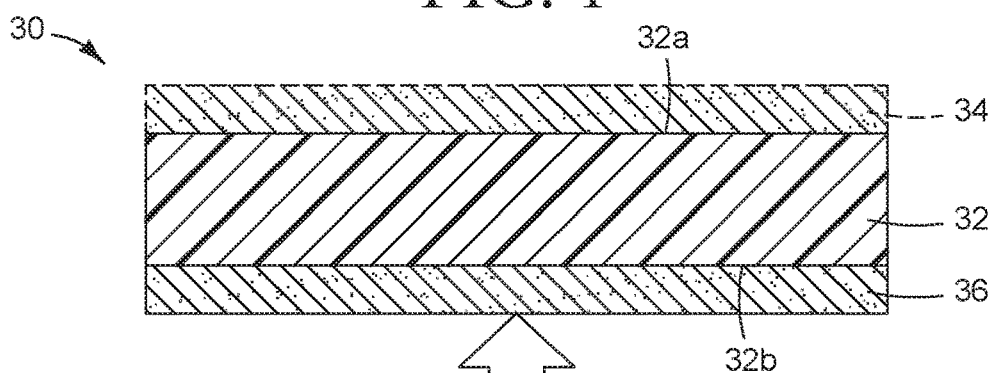
FIG. 2A is a cross-sectional view of a second element and a third element, prior to assembly, according to an example.
Figure 2A:
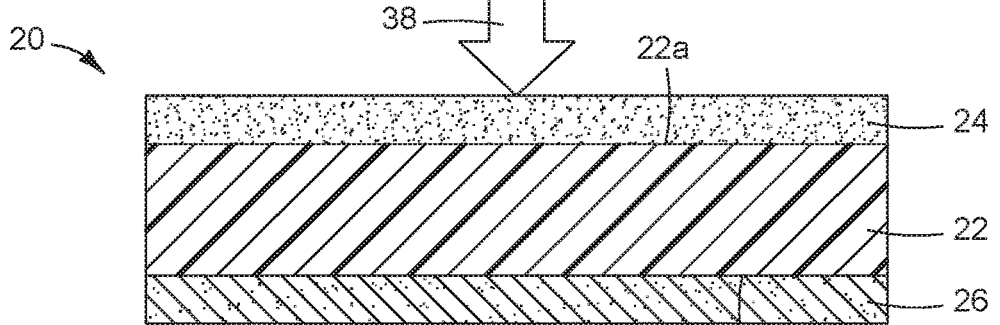

The film media may include three elements, provided as a kit having two parts. The first part, or first element, may be a single side coated transparent film. The second part is made up of two elements (second element and third element). The second element may be a double side coated film characterized as a translucent film, and the third element may be a single or double side coated film/paper backing. The second and third elements may be combined, such as by lamination, to form the second part before final assembly. FIGS. 1-3 illustrate example structures of the film media at various stages. FIG. 4 illustrates an example method for manufacturing the film media.

First Film Element

Referring now to FIG. 1, a first film element 10 is shown. The first film element 10 may include a first film 12, which may be transparent. In some examples, "transparent" means 100% transparent to light (optical radiation). The transparency level of the first film 12 when coated may be greater than 90% in an example and greater than 95% in another example.

The addition of one or more coatings may reduce the transparency, as discussed further below. The transparent film 12 may be clear, colored, or dyed. It may be appreciated that the transparency of a film may be reduced due to the use of colored or dyed film or and/or to the use of additional layers formed thereon.

The first film 12 may contain two sides, a front side 12a and a back side 12b. The front side 12a of the film 12 may be a high gloss smooth surface, facing an observer (shown in FIG. 3B). The smoothness of a surface may be defined in terms of the peak to valley value of the surface. As used herein, a "smooth" surface has a peak to valley height of about 3 Angstroms to about 200 Angstroms.

There may be no coating layer applied on the front side 12a. On the back side 12b, which is opposite to front side 12a of the film 12, an image-receiving layer(s) 14 may be coated. A mirror-reflected reverse image 16 may be printed on top of the image-receiving layer 14, using a latex, or other, ink. The mirror-reflected reversed image 16 is shown in phantom, since it in fact may not be printed until at a later time, by a user.

The glossy appearance of the first film element 10 and the glossy appearance of the printed image 16 may be substantially determined by the gloss level of the uncoated front surface 12a of the first film 12. To achieve superior image gloss, the gloss level ("high gloss") of the uncoated side 12a of first film 12 may be greater than 95% gloss units in one example, and may be greater than 99.5% gloss units in another example, where gloss units are obtained by Test Method ASTM D2457, which is a measurement of specular gloss of the films at 20°, with a polished black glass with a refractive index of 1.567 being used as a standard and assigned a gloss of 100.

The first film element 10 may be made of a polymeric film. The polymeric film can be selected from, for example but not limited to, polyethylene-based films, polyethylene copolymer-based films, polypropylene films, polypropylene copolymer based-films, and polyester-based films. In one example, the first film element 10 is a polyester film derived from an aromatic dicarboxylic acid as the main acid component and an alkylene glycol as the main glycol component. Further examples include polyester polymers derived from an aromatic dicarboxylic acid such as terephthalic acid, isophthalic acid, naphthalene-dicarboxylic acid, diphenyl dicarboxylic acid, diphenyl ether dicarboxylic acid, diphenylketone dicarboxylic acid, diphenylsulfone dicarboxylic acid, diphenylether dicarboxylic acid, α,β-bis(2-chlorophenoxy)ethane-4,4'-dicarboxylic acid anthracene-dicarboxylic acid or the like as the acid component, and an alkylene glycol such as ethylene glycol, trimethylene glycol, tetramethylene glycol, pentamethylene glycol, hexamethylene glycol hexylene glycol or the like as the glycol component. Specific examples of polyester polymers include a polyethylene terephthalate polymer derived from terephthalic acid and ethylene glycol.

The image-receiving coating layer 14 on the first film element 10 may include a polymeric resin network, a polymeric binder, and large polymeric particles. A polymer resin network refers to a polymer and/or a polymer mixture which can be cross-linked by reaction of different functional groups in the same molecular chain or inter-cross-linked by reaction with another molecular chain, which has one or more different functional groups. The polymeric network can substantially react with the polymer binder in an example, and in another example, the polymeric network may be substantially not reactive with the polymer binder, depending on whether the binder has any reactive functional groups (reactive) or no reactive functional groups (nonreactive). The word "substantially" means that the tendency of reaction, or reaction speed, between two polymer systems is comparable.

The large polymeric particles in the image-receiving layer 14 may refer to a micronized polymeric solid powder, which may be dispersible in an aqueous solvent for easy coating application. The large polymeric particles may be chemically inert to any polymeric network or polymer binder, meaning that there is no any chemical bond or action forming with the network or binder during the coating processing, including mixing, coating application, and drying, to avoid any alteration of any physical properties of the polymeric network. The polymeric particles may have a melting point greater than 130° C. to avoid any collapse of the particle during drying of the coating. The size of the polymeric particles may be within a range from about 1.5 micrometers (µm) to about 20 µm.

In one example, the polymeric network may be a self-cross-linked polyurethane formed by reacting an isocyanate with a polyol, where both isocyanates and polyols have an average of less than three end functional groups per molecule so that the polymeric network is based on a linear polymeric chain structure. In an example, the polyurethane chain has a trimethyloxysiloxane group and cross-linking takes place by hydrolysis of the functional group to form a silsesquioxane structure. In another example, the polyurethane chain has an acrylic functional group, and the cross-linked structure can be formed by nucleophilic addition to the acrylate group through an acetoacetoxy functionality.

In an example, the second polymeric network is a cross-linked polyglycidyl or polyoxirane resin. Cross-linking takes place either with the same functional groups through catalytic homopolymerization of an oxirane function group or with a wide range of co-reactants, including polyfunctional amines, acids, acid anhydrides, phenols, alcohols, and thiols. Both polyglycidyl resin and co-reactants may be immiscible with the first polymeric network before curing in the liquid state. "Immiscible" as used herein refers to significant phase separation after mixing at room temperature.

In an example, the large polymeric particles are an anionic-dispersed micronized high density polyethylene slurry, and in another example, the polymeric particles are an anionic-dispersed micronized high density polypropylene slurry. The polymeric particle may be functionalized as the slip control agent in order to reduce mechanical friction to the printed media surface when the media is subjected to a rubbing action.

The polymeric binder may be selected from the group of water-soluble binders and water-dispersible polymer binders that exhibit high binding power for the base film and pigments, either alone or in a combination. In some examples, the polymeric binder components have a glass transition temperature ($T_g$) ranging from −30° C. to +50° C. Water-dispersible binders can be in any form of emulsion or latex with any kind of backbone structure, such as acrylic polymers or copolymers, vinyl acetate latex, polyesters, vinylidene chloride latex, styrene-butadiene or acrylonitrile-butadiene copolymers. Non-limiting examples of suitable binders include styrene butadiene copolymers, polyacrylates, polyvinylacetates, polyacrylic acids, polyesters, polyvinyl alcohols, polystyrenes, polymethacrylates, polyacrylic esters, polymethacrylic esters, polyurethanes, copolymers thereof, and combinations thereof. In some examples, the binder is a polymer and copolymer selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers. In some other examples, the binder component is a latex containing particles of a vinyl acetate-based polymer, an acrylic polymer, a styrene polymer, an SBR (styrene-butadiene-rubber)-based polymer, a polyester-based polymer, a vinyl chloride-based polymer, or the like. In yet some other examples, the binder is a polymer or a copolymer selected from the group consisting of acrylic polymers, vinyl-acrylic copolymers and acrylic-polyurethane copolymers.

The example of water-soluble binder include but not limited to, poly(ethylene oxide), poly(ethylene oxide-b-propylene oxide), poly(acrylic acid), poly(styrenesulfonic acid), poly(vinyl alcohol), poly(4-vinylpyridine), poly(2-vinylpyridine), poly(N-vinylpyrrolidone), poly(2-ethyl-2-oxazoline), poly(1-glycerol methacrylate), poly(acrylamide, polymethacrylamide, poly(butadiene/maleic acid), poly(allyl amine), poly(N-iso-propylacrylamide), starch derivatives, such as dextrin, alkaline-modified starch, oxidized starch, phosphated monostarch, enzyme-treated starch, acetylated starch, hydroxypropylated starch, hydroxyethyl starch, with ethylene oxide, cationic starch and carboxymethylated starch, gelatin, and cellulose derivatives such as carboxymethyl ether cellulose, ethyl ether cellulose, ethyl hydroxyethyl ether cellulose, methyl hydroxyethyl ether cellulose and chitosan. Examples of suitable water-dispersible binders include, but are not limited to, acrylic polymers or copolymers, vinyl acetate latex, polyesters, vinylidene chloride latex, and styrene-butadiene or acrylonitrile-butadiene copolymer latex.

The binder may have an average molecular weight (Mw) of about 5,000 to about 500,000 (weight average). In some examples, the binder has an average molecular weight (Mw) ranging from about 150,000 to about 300,000. In some other examples, the binder has an average molecular weight of about 250,000.

Before applying any coating, a corona treatment may be employed to the surface of the polymeric film to improve surface polarity or to increase the surface tension. Alternatively, a tie layer of about 0.5 µm to about 5 µm in thickness using a copolymer emulsion of butyl acrylate-ethyl acrylate copolymer may be applied to the base film.

The first film element 10 may be considered to be the first part, which, as explained below, is used in conjunction with the second part as part of the kit.

Second Film Element

The second film element 20 may be a double side coated film, or second film, 22 (coated on both sides), having front side 22a and back side 22b. The substrate of the second film 22 can be any kind of polymeric film, but in some examples, a film with a polyethylene structure, a film with a polyethylene terephthalate (PET) structure, or a film with a polypropylene structure may be used. The second film 22 may be the same polymeric film as or different than the first film 12. Before applying any coating, a corona treatment may be used to improve surface polarity. Alternatively, a tie layer of about 0.5 µm to about 5 µm in thickness using a copolymer emulsion of butyl acrylate-ethyl acrylate copolymer may be applied to the base film. The thickness ratio of second film 22 to that of first film 12 may be within a range of about 1 to 20 to about 1 to 5. The front side 22a, which eventually may be next to the first film element 10, may be coated with an adhesion layer 24. The back side 22b, i.e. the side which eventually may be opposite to the first film element 10, may be coated with a light diffusion layer 26.

The adhesion layer 24 on the front side 22a of second film element 20 may function to provide an adhesion force between first film element 10 and the second film element 20. The adhesion layer 24 may be made of viscoelastic polymers that are capable of bonding and de-bonding with another surface. The polymer can be selected from low $T_g$ polymers, such as a polymer or copolymer or a polymeric blend with $T_g$ lower than −10° C. Examples of these polymers include acrylate polymers (e.g., 2-ethylhexyl acrylate, n-butyl acrylate, methyl acrylate and t-butyl methacrylate); high molecular weight rubbers with Mw greater than 10,000 (e.g., natural rubber or synthetic thermoplastic elastomer); and silicone rubber. The adhesion layer composition can optionally contain some lower molecular weight resins, compared to the viscoelastic resins listed above, to balance bonding and de-bonding performance. The term "lower molecular weight" may refer to Mw less than 5,000. Examples of lower molecular weight resins include, but are not limited to, rosins and their derivatives, terpenes and modified terpenes, aliphatic, cycloaliphatic, and aromatic resins (such as C5 aliphatic resins, C9 aromatic resins, and C5/C9 aliphatic/aromatic resins), hydrogenated hydrocarbon resins, and their mixtures, and terpene-phenol resins. Other additives, such as surfactants and solvents which help the coating processing can optionally be included in the adhesion coating composition.

The light diffusion layer 26 on the back side 22b of the second film element 20 may accommodate two competing effects, maximally and uniformly diffusing back light from a back light source 52 (shown in FIG. 3) but minimally retarding light passing through. The light diffusion layer 26 may have two kinds of particles for scattering the light, where scattering is defined as a change in direction of light by particles in a layer, along with other components, such as binders in the layer, when the particles have a different refractive index from other components in the layer. The light scattering can make the base film 22 appear opaque with white color and the hiding power of the light diffusion layer 26 (where the viewer does not see the light source 52). Light scattering also diffuses the non-uniformity of the light from the light source. Since scattering depends on the difference of the refractive index of particle and matrix, in some examples, the first type of particles, or main particles, may have a high refractive index of greater than 1.8, and, in some examples, greater than 2.0. Examples of such high refractive index materials include rutile and anatase, both titanium dioxide ($TiO_2$) with a refractive index higher than 2.5. In the present disclosure, the particle size may play an important role. The primary particles as defined by D50 (D50 means that 50% of the particles have a size greater than a stated size and 50% of the particles have a size less than a stated size) have a particle size within a range of about 500 nm to about 600 nm. This is an example of a particle size range which can maximally scatter the visible light in a wavelength range of λ~400 nm to 800 nm. In order to further disperse the particles, and prevent any agglomeration, a dispersing agent and second particles may be used. These second particles may have a particle size within a range of about 1.5 times to about 3 times larger than the first particles. The refractive index of the second particles may have a δ between 0.4 and 1.8 in the complex refractive index equation, where δ, the real component, describes the dispersive aspects of the wave-matter interaction. There is no specific requirement of the chemical composition of the second particles so long as they meet the particle size and refractive index requirements. Examples of the second particles may include, but are not limited to, calcium carbonate, zeolite, silica, talc, alumina, aluminum trihydrate (ATH), calcium silicate, kaolin, calcined clay, and combinations or mixtures of any of these. The ratio by weight of the first particles to the second particles may range from about 1:1 to about 1:50.

The first particles or second particles or both inorganic nanoparticles utilized in the present disclosure may also be surface-modified before mixing into the coating composition, depending on the particular chemical composition of the particles and the stability requirement. The surface modification treatment may be accomplished by physically or chemically modifying the surface or both. In one example, the organic compounds are organosilanes. Organosilanes may be represented by the general formula $(RO)_4-XSiY_n$, where X is an integer from 1 to 3. Each R may be individually a hydrocarbyl group containing from 1 to 12 carbon atoms. Each Y may be individually an amino group or a hydrocarbyl group containing from 1 to 12 carbon atoms (n). The RO groups are hydrolysable in a neutral to acidic environment. Examples of suitable organosilanes include: γ-aminopropyltriethoxy silane, monoamino silane, diamino silane, triamino silane, bis(2-hydroethyl)-3-aminopropyltriethoxysilane, 3-mercaptopropyltrimethoxysilane, 3-glycidoxypropyltrimethoxysilane, bis(triethoxysilylpropyl)disulfide, 3-aminopropyltriethoxysilane, bis-(trimethoxysilylpropyl)amine, N-phenyl-3-aminopropyltrimethoxysilane, N-aminoethyl-3-aminopropylmethyldimethoxysilane, 3-ureidopropyltrimethoxysilane, 3-methacryloxypropyltrimethoxysilane, N-(trimethyloxysilylpropyl)isothiouronium chloride, N-(triethoxysilpropyl)-O-polyethylene oxide, 3-(triethoxylsilyl)propylsuccinic anhydride, 3-(2-imidazolin-1-yl)propyltriethoxysilane, 3-aminopropyltrimethoxysilane, N-(2-aminoethyl-3-aminopropyltrimethoxysilane, 3-(triethoxysilylpropyl)-diethylenetriamine, poly(ethyleneimine)trimethoxysilane, aminoethylaminopropyl trimethoxysilane, and aminoethylaminoethylaminopropyl trimethoxysilane.

The dispersing agent or a combination of several dispersing agents which may be used to disperse the first and second particles can optionally include dispersing the pigments or fillers which are used in the composition of this layer.

The thickness of the light diffusion layer 26 may also play a role to balance the competing aspects of diffusion and transparence discussed above. The optimum layer thickness very much depends upon the type and amount ratio of the particles described above. In the current disclosure, it was found that opacity of the light diffusion layer 26 is one of the best qualities to balance the competing aspects. High opacity may give good diffusion performance but decrease media transparence, whereas high transparence may provide non-uniform light distribution. It was found that opacity may range from 60 to 90% in some examples, and from 68 to 82 in other examples, and these values may accommodate the required performance.

In the light diffusion layer 26, a polymeric binder may also be included. The selection of the binder is same as described in the first film element 10, but chemically, it can be the same or different from that of first film element. For example, the polymeric binder may include, but is not limited to, polyvinyl alcohol, styrene-butadiene emulsion, acrylonitrile-butadiene latex, a combination of two or more of the above binders, a combination of one or more of the above binders with other aqueous binders, a mixture of two or more of the above binders, or a mixture of one or more of the above binders with other aqueous binders. Other aqueous binders that may be included in the aqueous-based polymeric binder include, but are not limited to, starch, such as, one or more oxidized starches, cationized starches, esterified starches, enzymatically denatured starches; gelatin; casein; soybean protein; cellulose derivatives, such as, one or both of carboxy-methyl cellulose and hydroxyethyl cellulose; acrylic emulsions; vinyl acetate emulsions; vinylidene chloride emulsions; polyester emulsions; and polyvinylpyrrolidone.

Third Film/Paper Element—Backing Support

The third element 30 may be a base film 32 formed of a polymeric film or cellulose paper (film/paper) to form a protection sheet to the adhesion layer 26 of the second film element 20. The polymeric film can be any of PET, polypropylene, or polyethylene, whether transparent, translucent or opaque. By "translucent" is meant that some light may pass through. By "opaque" is meant that the film is neither transparent nor translucent.

The base film 32 may have a front side 32a and a back side 32b. The third element 30 may be laminated with the second film element 20 after coating of the third element 30 is completed. The front side 32a of the third element 30 may be un-coated or optionally coated with a pigmented coating 34 (inorganic filler and binder) to correct any curling. The back side 32b of the third element 30 may be coated with an anti-blocking coating layer 36. The anti-blocking coating layer 36 may prevent transfer of the adhesive 26 to the base film 32 and may make it easier for a user to peel off. The anti-blocking coating layer 36 may be made of anti-blocking agents and other additives and/or solvents. The anti-blocking coating layer 36 may function to either lessen intermolecular interactions between the supporting base film 32 and the surface 26a of the adhesive 26 or prevent such close contact. Any low surface-tension material, such as waxes (e.g., petroleum waxes, polyethylene wax paraffin wax, carnauba wax, vegetable waxes, animal waxes, synthetic waxes and Lanolin); fatty acid metal soaps (e.g., metal stearates, magnesium stearate, and calcium ricinoleate); long-chain alkyl derivatives; silicon-based polymers, such as polydimethylsiloxane; and fluorinated polymer compounds, such as polytetrafluoroethylene and fluorinated fatty acids, can be used as anti-blocking agents. Other additives, such as surfactants and solvents that help the coating processing, can optionally be included in the anti-blocking coating composition.

The second film element 20 may be laminated, as shown by the double-headed arrow 38, with third firm/paper element 30 using an in-line laminator at the end of a coating line. The back side 32b (anti-blocking layer 36) of the third element 30 may be in contact with the front side 22a (adhesion layer 26) of the second film element 20.

Figure 2B:
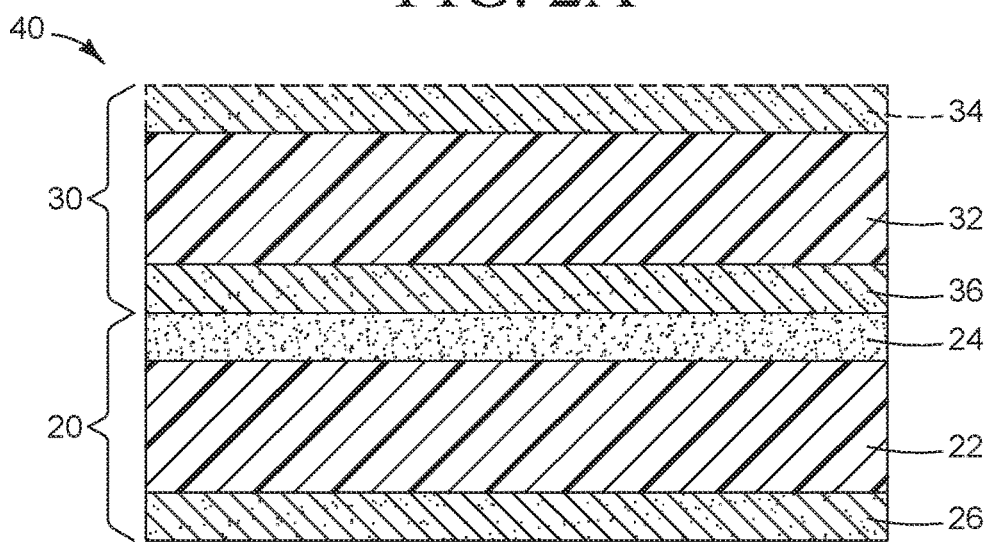
FIG. 2B shows the completed assembly of FIG. 2A, according to an example.

FIG. 2B shows the laminated assembly, or second part, 40.

Use of the Media

The film media may be provided to the user in a kit of the two parts, 10, 40. The first part 10 may be the first film element 10. The second part 40 may include the second film element 20 and the third film/paper element 30.

The two parts, 10, 40, may be supplied to the user, who may then cause an image 16 to be printed on the image-receiving layer 14. Specifically, the digital image 16 may be reversely printed on the image-receiving layer 14 of the first film element 10. Once printed, the first film element may be designated 10'.

Figure 3A:
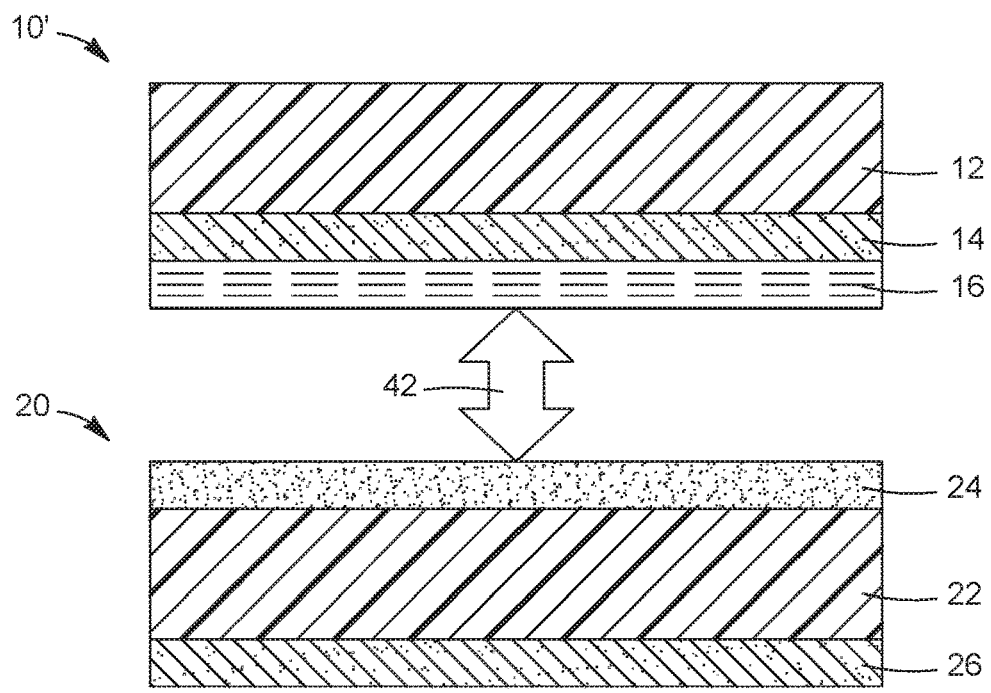
FIG. 3A is a cross-sectional view of the first element from FIG. 1 and the second element from FIG. 2, prior to assembly, according to an example.
Figure 3B:
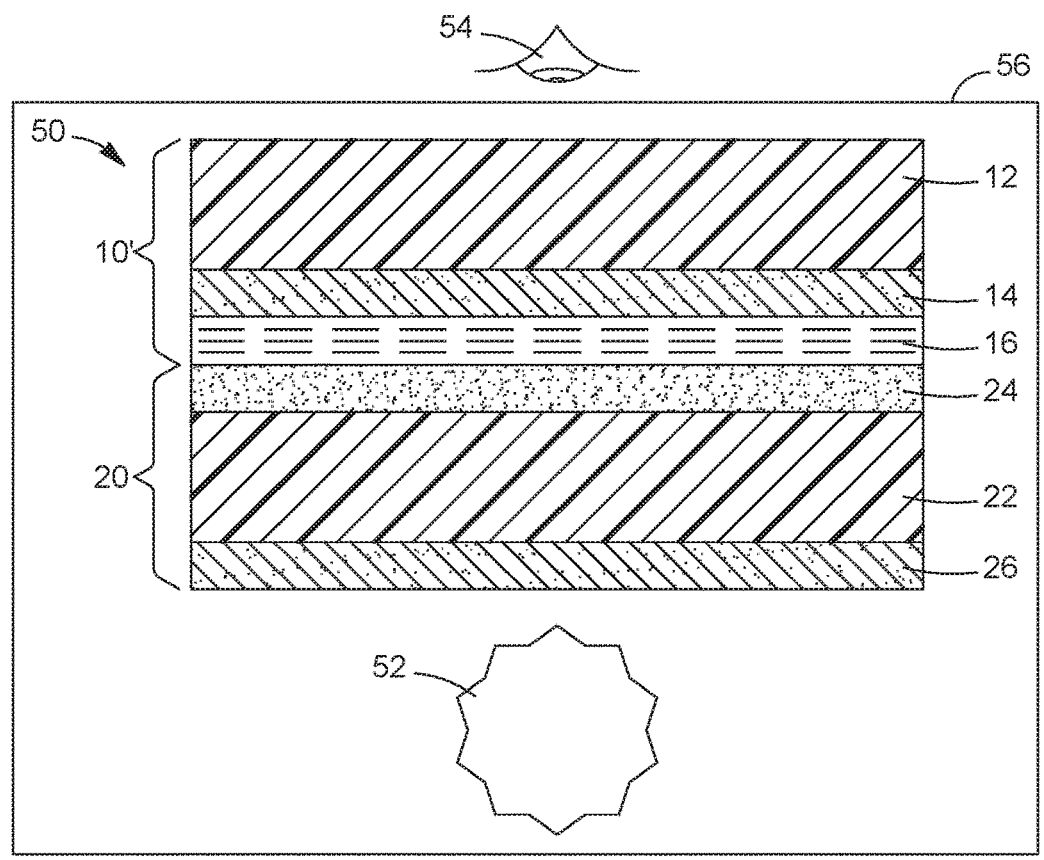
FIG. 3B shows the completed assembly of FIG. 3A, according to an example.
Figure 4:
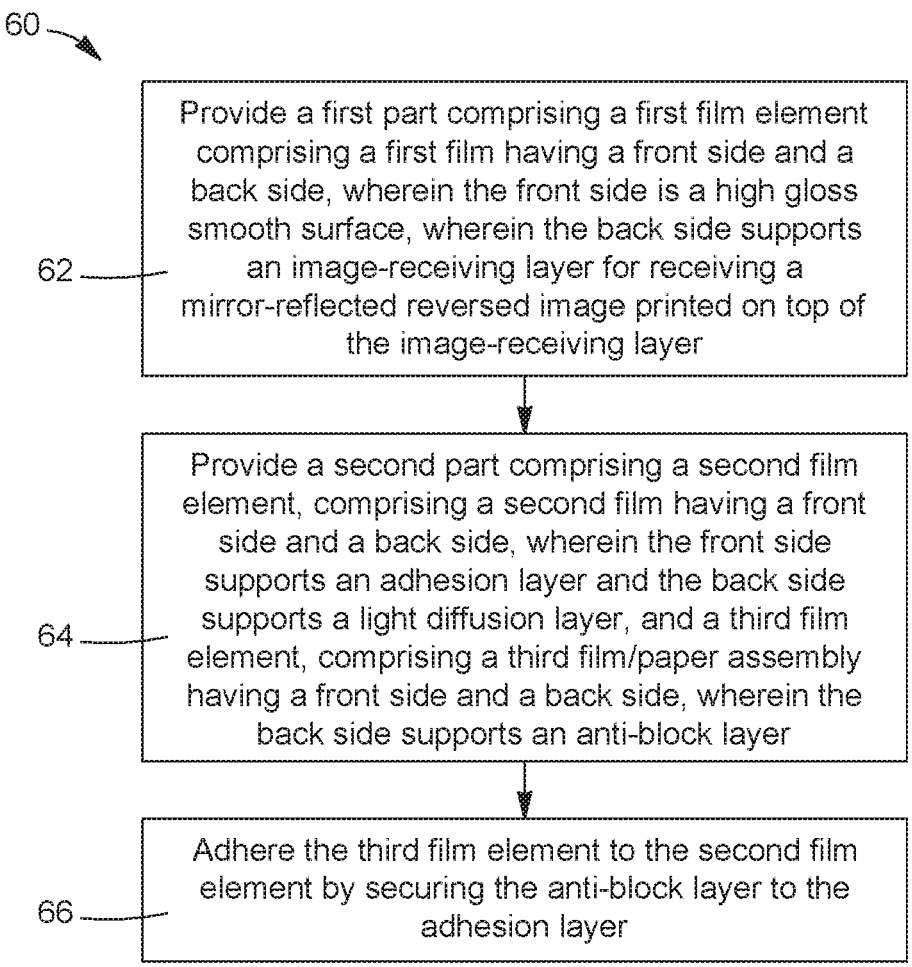
FIG. 4 is a flow chart, illustrating an example method for manufacturing the film media shown in FIGS. 3A-3B.

FIG. 3A depicts the two elements 10', 40, or film media kit, following printing and prior to assembly into a single printed media 50, shown in FIG. 3B. A lamination mechanism associated with the printer, or a stand-alone laminator, may be used by the user to laminate the printed first film element 10' with the second film element 20, with the adhesion layer 24 of the second film element in contact with the printed image 16 of the first film element. The lamination step is indicated by the double-headed arrow 42. The third film element 30 may not exist on the final print-out, since the film/paper 32 may be removed prior to the lamination.

FIG. 3B depicts the laminated assembly, or film media, 50. Also shown in FIG. 3B is the combination of a back-lit light 52, on the backside of the film media 50, and a viewer 54 (depicted as an eye) on the front side of the film media. The combination of the film media 50 and the back-lit light 52 may be contained in a housing 56. Illumination of the printed image 16 at night may be by the back-lit light 52, while illumination of the printed image during the day may be by ambient light, such as external lights (not shown) or the sun (not shown).

A method 60 of manufacturing a film media kit is depicted in FIG. 4. In FIG. 4 is shown a flow chart for the method 60. The method 60 includes providing 62 the first part 10 that is first film element 10. The first film element 10 may be formed of the first film 12 having front side 12a and back side 12b. The front side 12a may be a high gloss smooth surface. The back side 12b may support image-receiving layer 14 for receiving mirror-reflected reversed image 16 printed on top of the image-receiving layer. The nature of the first film 12 and its high gloss has been described above. The composition of the image-receiving layer 14 has been described above. The image-receiving layer 14 may be applied as a coating by a variety of methods, including, but not limited to, a slot coater, a curtain coater, a cascade coater, a blade coater, a rod coater, a gravure coater, a Mylar rod coater, a wired coater, knife coater, a microgravure coater, and the like. The formation of the image 16 itself is not performed as part of this process, but rather at a subsequent time by a user.

The method 60 further includes providing 64 second part 40 that is a combination of second film element 20 and third film element 30. The second film element 20 may be formed of second film 22 having front side 22a and back side 22b. The front side 22a may support the adhesion layer 24. The back side 22b may support the light diffusion layer 26. The compositions of the adhesion layer 24 and the light diffusion layer 26 are discussed above. These layers 24, 26 may each be applied independently as a coating by a variety of methods, including, but not limited to, a slot coater, a curtain coater, a cascade coater, a blade coater, a rod coater, a gravure coater, a Mylar rod coater, a wired coater, knife coater, a microgravure coater, and the like.

The third film element 30 may be formed of third film/paper 32 having front side 32a and back side 32b. The back side 32b may support the anti-block layer 36. The composition of the anti-block layer 36 is described above. The anti-block layer 36 may be applied as a coating by a variety of methods, including, but not limited to, a slot coater, a curtain coater, a cascade coater, a blade coater, a rod coater, a gravure coater, a Mylar rod coater, a wired coater, knife coater, a microgravure coater, and the like.

The method 60 may conclude with adhering 66 the third film element 30 to the second film element 20 by securing the anti-block layer 36 to the adhesion layer 24. Lamination 38 is an example of an adhering procedure that may be used to secure the anti-block layer 36 to the adhesion layer 24.

Printing Method

The printing method may encompass printing the reverse image 16 on the ink-receiving layer 14 on the second side 12b of the first film 12. The ink-receiving layer 14 may be configured to receive any inkjet printable ink, such as, for example, organic solvent-based inkjet inks or aqueous-based inkjet inks. The ink composition may form an image 16 on the image side 12b of the first film 12.

The image 16 may be deposited, established, or printed on the ink-receiving layer 14 using any suitable printing device. In some examples, the ink composition may be applied to the ink-receiving layer 14 via inkjet printing techniques. The ink may be deposited, established, or printed on the ink-receiving layer 14 via continuous inkjet printing or via drop-on-demand inkjet printing, which includes thermal inkjet printing and piezoelectric inkjet printing.

Representative examples of printers used to print, as defined herein, include, but are not limited to, HP DesignJet printers: L25500, L26500, and L65500; HP Scitex printers: LX600, LX800, LX850, and TurboJet 8600 UV from Hewlett-Packard Company. Representative inkjet inks used by the above-listed printers include, but are not limited to, HP 791, HP 792, and HP Scitex TJ210. The printers may be used in a conventional wall paper profile with a production print mode or a normal print mode. The print mode may vary the ink application within a range of from about 50% to about 250% of each other.

Some examples of inkjet inks that may be deposited, established, or otherwise printed on the ink-receiving layer 14 include pigment-based inkjet inks, dye-based inkjet inks, pigmented latex-based inkjet inks, and UV curable inkjet inks. Additionally, the ink-receiving layer 14 may also be configured to receive thereon a solid toner or a liquid toner. The solid toner or the liquid toner may include toner particles made, e.g., from a polymeric carrier and one or more pigments. The liquid toner may be an organic solvent-based (e.g., hydrocarbon) liquid toner. The solid toner or the liquid toner may be deposited, established, or otherwise printed on the ink-receiving layer 14 using, respectively, a suitable dry or liquid press technology, such as a dry toner electrophotographic printing device or a liquid toner electrophotographic printing device.

Final Assembly

After printing, the first film element 10 may be laminated with the second film element 20 and mounted on the light box 56. The lamination refers to the adhesive side 24 of the second film element 20 that adheres to the printed film element 16 of the first film element 10 when the films come into contact with each other.

Lamination may be accomplished using roll lamination, which is a process that involves two laminating rolls, a top and a bottom roll. The two laminating rolls may be placed on a lamination machine with the adhesive side 24 of the second film element 20 facing the imaged side 16 of the first element 10. In one example, heat may be applied to the rolls, on the order of 60° C. to 80° C. In another example, no heat may be applied to the rolls.

EXAMPLES

Example 1

First Film Element 10

A PET film was selected as the base film 12 for the first film element 10. Before applying the image-receiving layer 14, the base film 12 was first subjected to a corona treatment to improve surface polarity, or, alternatively, a tie layer of about 3 µm was applied using a copolymer emulsion of a butyl acrylate-ethyl acrylate copolymer.

Image-Receiving Layer 14:

The following Table I lists the formulation of the image-receiving layer:

TABLE I

| Chemical type | Commercial name | Parts (dry weight) |
| --- | --- | --- |
| polymeric network | Araldite ® PZ 3921 | 11 |
| polymeric network | Aradur ® 3985 | 14 |
| polymeric binder | Printrite ® DP376 | 18 |
| polymeric particle slurry | Slip-ayd ® SL 177 | 11 |
| surfactant | Tegowet ® 510 | 3 |

The image-receiving layer 14 was formed on the back side 12b of the base film 12 by a lab rod coater.

Second Film Element 20:

A PET film was selected as the base film 22 for the second film element 20. Before applying any coating layer, the base film 22 was subjected to a corona treatment to improve surface polarity, and then a tie layer of about 0.2 µm to about 0.5 µm was applied using a copolymer emulsion of a butyl acrylate-ethyl acrylate copolymer.

Light Diffusion Layer 26:

The following Table II lists the formulation for the light diffusion layer 26. The particles were pre-treated using gamma-aminopropyltriethoxy silane.

TABLE II

| Chemical | Parts (dry weight) |
| --- | --- |
| TI4-OX-02-P (titanium dioxide) | 15 |
| Hydrocarb ® 95 HS (calcium carbonate) | 85 |
| Acronal ® 866 (binder) | 18 |
| BYK 024 (deformer) | 1 |
| Tegowet ® 510 (surfactant) | 0.5 |
| Irgalite ® Violett (dye 1) | 0.007 |
| Irgalith Blau ® (dye 2) | 0.003 |

The light diffusion layer 26 was formed on the back side 22b of the base film 22 by a lab blade coater.

Adhesion Layer 24:

The following Table III lists the formulation for the adhesion layer 24.

TABLE III

| Chemical | Parts by weight |
| --- | --- |
| 2-ethylhexyl acrylate | 14 |
| n-butyl acrylate | 32 |
| rosin | 8.5 |
| toluene | 85 |

The adhesion layer 24 was formed on the front side 22a of the base film 22 by a lab blade coater.

Third Film Element 30:

A polypropylene film was selected as the base film 32 for the third film element 30. Before applying any coating layer, the base film 32 was subjected to a corona treatment to improve surface polarity.

Anti-Blocking Layer 36:

The following Table IV lists the formulation of the anti-blocking layer 36:

TABLE IV

| Ingredients | Description | Amount (parts by weight) |
| --- | --- | --- |
| Silcolease ® 7460 (Bluestar) | vinylic polyorganosiloxane copolymer | 1 |
| Silcolease ® 93B (Bluestar) | Pt catalyst | 0.012 |
| Silcolease ® RCA (Bluestar) | 3-D siloxane | 0.015 |
| methylhexane (Aldrich) | solvent | 25 |
| | Coat weight | 0.65 g/m$^2$ |

The anti-block layer 36 was formed on the back side 32b of the base film 32 by a lab rod coater.

After printing, the first film element 10 was laminated with the second film element 20 and mounted on the light box 56. Specifically, the adhesive 24 of the second film element 20 was adhered to the printed film element 16 of the first film element 10.

The media in the examples were evaluated by printing images on using a large format, thermal latex inkjet printer HP L350 with a 6-ink color system: cyan, magenta, yellow, black, light cyan, and light magenta. Each of the inks was a pigmented aqueous latex ink. The print mode was a 16-pass, bidirectional, in native color mode (no color rendering), and the heater was at setpoints of 50° C. and 110° C.

Image Evaluation:

Reflective and Transmissive Gamut:

The reflective gamut was determined with a Spectrolino spectrophotometer with illumination type D50 and observer angle of 2°. The transmissive gamut was determined with a Barbieri spectrophotometer with illumination type D50 and observer angle of 2°.

Each sample was also examined visually by multiple inspectors under a controlled light box with D65 fluorescent lighting following an established procedure, i.e. ISO 10526: 1999/CIE S005/E-1998. Apart from generating numeric data, like optical density and gamut, the inspectors looked specifically for overall image quality and gave each of the samples a simple rating from 1 (poor image quality) to 5 (good image quality).

Durability Evaluation

Durability was tested in terms of ink transfer and anti-scratch ability using Taber 5700 Linear Abraser. The ink transfer was evaluated by determining the amount of ink transferred to a test cloth under a tip load weight of 800 g with 5 cycles. Anti-scratch ability was evaluated by a coin scratching test method using the same machine. The coin was set up at a 75 degree angle and the loading force was incrementally increased from 130 g, to 300 g, to 550 g, and to 800 g.

The light diffusion ability was evaluated by mounting the test media onto the standard LED lighting box without any diffusion panel. The results, shown in Table V, were determined by observing light distribution across the full lighting box panel.

TABLE V

Summarized Results:

| | Example 1 (film assembly) |
|---|---|
| Transmissive gamut | 790,000 |
| Reflective gamut | 580,000 |
| Gloss (20°) | >100% |
| Average total image quality (5 inspectors) | 4.8* |
| Ink transfer (on printed surface before lamination) | 4.5* |
| Ink transfer (on assembly surface after lamination) | 5* (literally not transferable) |
| Anti-coin scratch (on printed surface before lamination) | 4.8* |
| Anti-coin scratch (assembly surface after lamination) | 5* (literally not scratchable) |
| Light uniformity | 5* |

*Score: 1 = Poor; 5 = Best

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 5,000 to about 500,000 should be interpreted to include not only the explicitly recited limits of about 5,000 to about 500,000, but also to include individual values, such as 100,000, 250,000, etc., and sub-ranges, such as from about 150,000 to about 300,000, etc. Furthermore, when "about" is utilized to describe a value, this is meant to encompass minor variations (up to ±10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A film media kit, including:
   a first part comprising a first transparent film element comprising a first film having a front side and a back side, wherein the front side is a high gloss smooth surface, wherein the back side supports an image-receiving layer for receiving a mirror-reflected reversed image printed on top of the image-receiving layer; and
   a second part comprising
      a second transparent film element, comprising a second film having a front side and a back side, wherein the front side supports an adhesion layer and the back side supports a light diffusion layer, and
      a third film element, comprising a third film/paper having a front side and a back side, wherein the back side supports an anti-block layer,
   wherein the front side of each film element is to face an observer and an external source of light,
   wherein the back side of each film element is to face a back light, and
   wherein the third film element is adhered to the adhesion layer of the second film element through the anti-block layer of the third element.

2. The film media kit as defined in claim 1 wherein the first film is transparent.

3. The film media kit as defined in claim 2 wherein the first film comprises a polymeric film, wherein the polymeric film is selected from the group consisting of polyethylene-based films, polyethylene copolymer-based films, polypropylene films, polypropylene copolymer based-films, and polyester-based films.

4. The film media kit as defined in claim 1 wherein the high gloss surface of the first film has a gloss that is greater than 95% gloss units at a viewing angle of 20° as determined by Test Method ASTM D2457.

5. The film media kit as defined in claim 1 wherein the image-receiving layer includes a polymeric network, a polymeric binder, and large polymeric particles.

6. The film media kit as defined in claim 1 wherein the second film comprises a polymeric film, wherein the polymeric film is selected from the group consisting of polyethylene-based films, polyethylene copolymer-based films, polypropylene films, polypropylene copolymer based-films, and polyester-based films.

7. The film media kit as defined in claim 1 wherein the adhesion layer comprises a viscoelastic polymer that is capable of bonding and de-bonding with another surface.

8. The film media kit as defined in claim 1 wherein the light diffusion layer comprises two different kinds of particles for scattering light, wherein a first kind of particle has a refractive index of greater than 1.8 and a particle size within a range of about 500 nm to about 600 nm and wherein a second kind of particle has a particle size within a range of about 1.5 times to about 3 times larger than the first kind of particles.

9. The film media kit as defined in claim 1 wherein the third film/paper comprises a base film of either a polymeric film or cellulose paper, wherein the polymeric film is selected from the group consisting of polyethylene terephthalate (PET), polypropylene, and polyethylene, whether transparent, translucent or opaque.

10. The film media kit as defined in claim 1 wherein the anti-block layer comprises an anti-blocking agent to either lessen intermolecular interactions between the third paper/film and the adhesion layer or prevent such close contact.

11. A method of manufacturing a film media kit including:
providing a first part comprising a first transparent film element comprising a first film having a front side and a back side, wherein the front side is a high gloss smooth surface, wherein the back side supports an image-receiving layer for receiving a mirror-reflected reversed image printed on top of the image-receiving layer; and
providing a second part comprising
- a second transparent film element, comprising a second film having a front side and a back side, wherein the front side supports an adhesion layer and the back side supports a light diffusion layer, and
- a third film element, comprising a third film/paper having a front side and a back side, wherein the back side supports an anti-block layer; and
adhering the third film element to the second film element by securing the anti-block layer to the adhesion layer.

12. The method as defined in claim 11 wherein the image-receiving side is to be printed on, followed by removal of the third film element and laminating the adhesion layer on front side of the second film element to the printed image-receiving side of the first film element.

13. The method as defined in claim 11 wherein the high gloss surface of the first film has a gloss that is greater than 95% gloss units at a viewing angle of 20° as determined by Test Method ASTM D2457.

14. The media as defined in claim 11 wherein the first film and the second film each comprise a polymeric film, wherein each polymeric film is separately selected from the group consisting of polyethylene-based films, polyethylene copolymer-based films, polypropylene films, polypropylene copolymer based-films, and polyester-based films.

15. A film media for both front-lit viewing and back-lit viewing including:
- a first transparent film element comprising a first film having a front side and a back side, wherein the front side is a high gloss smooth surface, wherein the back side supports an image-receiving layer having a mirror-reflected reversed image printed thereon; and
- a second transparent film element, comprising a second film having a front side and a back side, wherein the front side is adhered to the image-receiving layer through an adhesion layer and wherein the back side supports a light diffusion layer, and
- a back light for providing backlighting,
wherein the front side of each film element is to face an observer and an external source of light,
wherein the back side of each film element is to face the back light.

* * * * *